US012615199B2

(12) United States Patent
Mamidwar et al.

(10) Patent No.: US 12,615,199 B2
(45) Date of Patent: Apr. 28, 2026

(54) SYSTEMS AND METHODS FOR LATENCY MONITORING

(71) Applicant: Avago Technologies International Sales Pte. Limited, Singapore (SG)

(72) Inventors: Rajesh Shankarrao Mamidwar, San Diego, CA (US); Xuemin Chen, Rancho Santa Fe, CA (US); Victor T. Hou, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/645,705

(22) Filed: Apr. 25, 2024

(65) Prior Publication Data

US 2025/0337672 A1     Oct. 30, 2025

(51) Int. Cl.
H04L 43/0852          (2022.01)
H04L 43/065          (2022.01)
H04L 43/106          (2022.01)

(52) U.S. Cl.
CPC ........ H04L 43/0852 (2013.01); H04L 43/065 (2013.01); H04L 43/106 (2013.01)

(58) Field of Classification Search
CPC .. H04L 43/0852; H04L 43/065; H04L 43/106
See application file for complete search history.

(56) References Cited

U.S. PATENT DOCUMENTS

| | | | | |
|---|---|---|---|---|
| 10,284,460 B1* | 5/2019 | Bshara | ................... | H04L 45/26 |
| 2015/0281028 A1 | 10/2015 | Akhter et al. | | |
| 2016/0277272 A1 | 9/2016 | Peach et al. | | |
| 2017/0093677 A1* | 3/2017 | Skerry | ................... | H04L 43/20 |
| 2020/0186465 A1* | 6/2020 | Dontula Venkata | .... | H04L 43/12 |
| 2020/0287967 A1* | 9/2020 | Gafni | ..................... | H04L 69/22 |
| 2022/0173992 A1* | 6/2022 | Filsfils | ................... | H04L 69/22 |
| 2022/0294711 A1* | 9/2022 | Rangarajan | ............. | H04L 47/32 |
| 2023/0072376 A1* | 3/2023 | Kittner | ................ | H04L 47/6275 |
| 2023/0121212 A1* | 4/2023 | Bashan | ............... | H04L 47/2483 370/235 |
| 2023/0269156 A1 | 8/2023 | Hong et al. | | |
| 2024/0195724 A1* | 6/2024 | Kavia | ................... | H04L 43/106 |
| 2024/0223434 A1* | 7/2024 | Cheng | .................... | H04L 41/16 |

OTHER PUBLICATIONS

Extended European Search Report on Appln. No. 25172166.8 dated Sep. 17, 2025.

* cited by examiner

*Primary Examiner* — Jerry B Dennison
(74) *Attorney, Agent, or Firm* — Foley & Lardner LLP

(57)          ABSTRACT

Some embodiments relate to systems and methods for low latency monitoring. A communication system can include an application operating on the first device. The application is configured to append time stamps to a first packet received by the first device. The time stamps indicate a first time the first packet is received by the first device and a second time the first packet is sent by the first device.

13 Claims, 7 Drawing Sheets

SYSTEMS AND METHODS FOR LATENCY MONITORING

FIELD OF THE DISCLOSURE

This disclosure generally relates to systems for and methods of communication, including but not limited to, communications associated with internet service provider (ISP) networks, cables modems, gigabit passive optical network (GPON) devices, set top boxes, televisions, user devices, Ethernet network devices, and/or wireless devices. Some embodiments in the disclosure relate to monitoring, analytics and/or optimization related to latency for such communications.

BACKGROUND OF THE DISCLOSURE

Latency issues in communications between a home network and an ISP can lead to various challenges and disruptions in internet connectivity and user experience especially for evolving low latency usages including but not limited to video conferencing, cloud gaming, augmented reality/virtual reality (AR/VR) applications, and metaverse applications.

ISPs are companies that provide internet access to individuals and businesses. ISPs generally own, lease and manage a network infrastructure that connects users to the internet. This infrastructure can include various components such as data centers, routers, switches, coaxial cables, and fiber optic cables. ISPs obtain internet connectivity from larger networks, such as backbone providers or internet exchange points (IXPs), and distribute communication services to their customers.

Latency can be associated with one or more parties (e.g., cloud providers, ISPs, application developers and silicon vendors) and one or more devices and networks, including but not limited to ISP networks, cables modems, GPON devices, set top boxes, WiFi networks, Ethernet networks, access networks, backbone networks, and cloud infrastructure. To support internet speeds, ISPs are using larger burst data communications which often require larger buffers at each node. Larger bursts/buffers can increase communication latencies.

Latency can be manifested as slow response times (e.g., when loading web pages, streaming videos, or downloading files), decreased quality of real-time applications (e.g., low latency applications that rely on real-time communication, such as video conferencing, voice over IP (VOIP) calls, and online gaming), buffering and interruptions in streaming, unstable connections, adverse impact on cloud-based services (e.g., file storage, email, and productivity tools, affecting productivity and efficiency), increased vulnerability to cyberattacks, and limited capacity for interactive applications (e.g., limit the effectiveness of interactive applications that require real-time user input, such as online collaborative tools, virtual classrooms, and remote desktop applications). High latency can result in choppy video/audio playback, laggy conversations, and delayed reactions in online games, leading to a poor user experience and communication difficulties. High latency can result in data packets arriving out of order or being delayed, leading to pauses in playback and degraded streaming quality. High latency can provide attackers with more time to exploit security vulnerabilities and launch malicious attacks, such as distributed denial-of-service (DDOS) attacks or man-in-the-middle (MitM) attacks.

BRIEF DESCRIPTION OF THE DRAWINGS

Various objects, aspects, features, and advantages of the disclosure will become more apparent and better understood by referring to the detailed description taken in conjunction with the accompanying drawings, in which reference characters identify corresponding elements throughout. In the drawings, like reference numbers generally indicate identical, functionally similar, and/or structurally similar elements.

Figure 1:
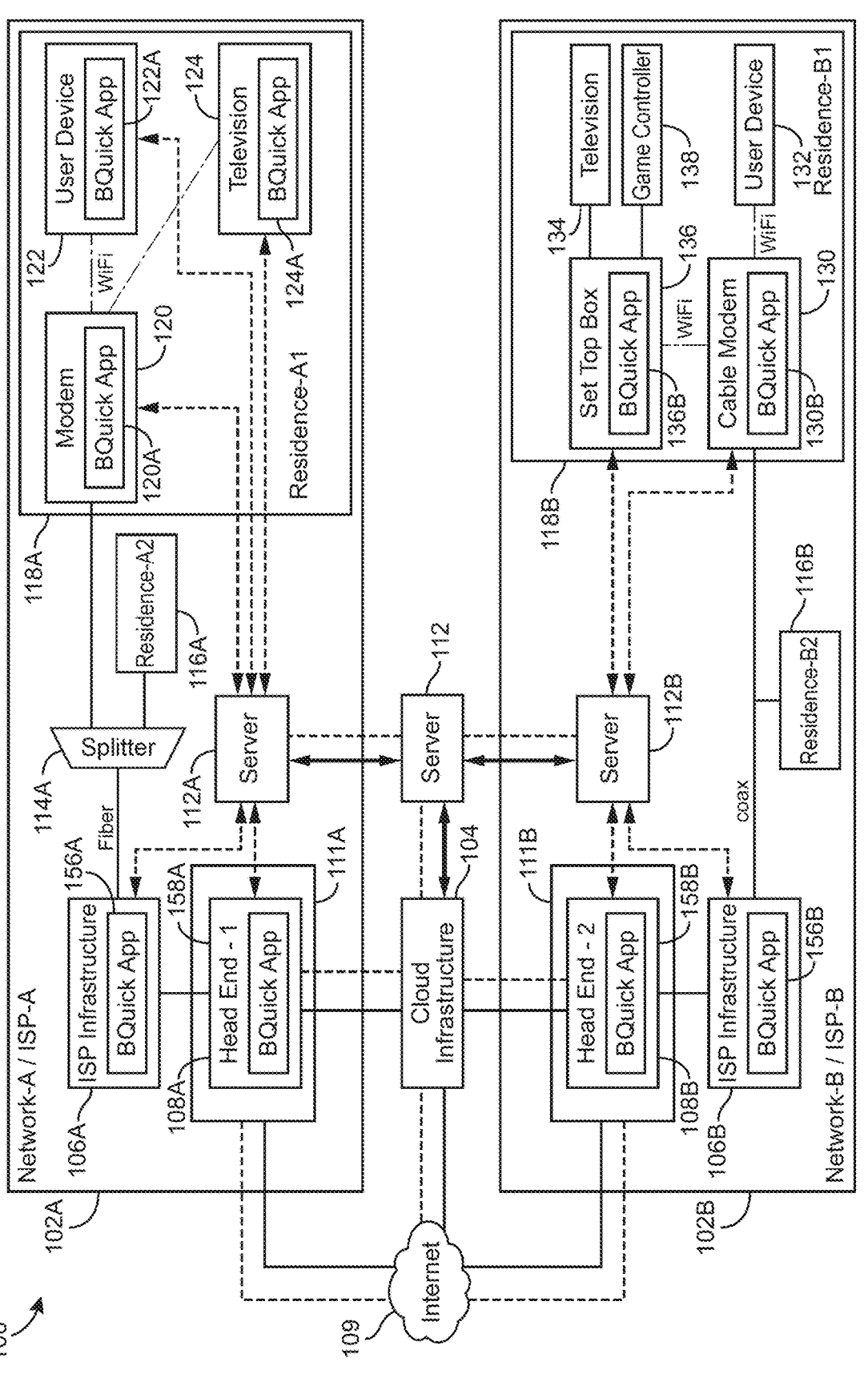
FIG. 1 is a general schematic block diagram of a communication system according to some embodiments.

The details of various embodiments of the methods and systems are set forth in the accompanying drawings and the description below.

DETAILED DESCRIPTION

The following standard(s), including any draft versions of such standard(s), are hereby incorporated herein by reference in their entirety and are made part of the present disclosure for all purposes: IEEE 802.11™, IEEE P802.3™, IEEE 1588, ITU GPON standards G.984.2, G.987.2, G.9807.1, G.989.2, G.9804.3, IEEE EPON standards 802.3ah, 802.3av, 802.3ca, and DOCSIS family of cable modem-related specifications . . . . Although this disclosure may reference aspects of these standard(s), the disclosure is in no way limited by these standard(s).

Devices provided by ISPs and customer-owned AR/VR setups, mobile phones, OTT devices, and cloud gaming clients are configured for low latency uses in some embodiments. Some embodiments of systems and methods disclosed herein provide a real time or near real time system to monitor end to end latencies. In some applications, timestamp synchronization with applications at intermediate nodes and end devices use precision time protocol (PTP) synchronization protocols for latency monitoring. In some embodiments, latency is monitored from end-to-end so that latency of all devices within the entire end-to-end process is considered, thereby enabling identification of the origins of substantial latency.

In some embodiments, the systems and methods achieve synchronization of the wall clock across all nodes and end-user devices by employing timestamps for low latency data packets at each node. The determination of latency at each node is made by applications at each node. The determination of latency is reported back to a server that communicates with the applications. The systems and methods allow the communication system to distinguish whether latency arises from the home network, an ISP, or cloud servers.

Some embodiments of systems and methods disclosed herein use a server extension that interacts with household devices. A latency application server extension is integrated into the ISP-provided modem or router in some embodiments. In some embodiments, the server extensions have the ability to filter and transmit all necessary information to the ISP's cloud server or share open data with application developers. The server extension can store or receive information about a customer's low latency plan subscription and can track low latency usages inside the home in some embodiments.

A server extension can refer to a software component or module that extends the functionality of a server application (e.g., a latency application) in some embodiments. Server extensions can be used in various server environments such as web servers, application servers, ISP servers, and database servers to enhance their capabilities or to add specific features tailored to the needs of users or applications and can be installed using extension files. The extensions can be installed on any of the devices discussed herein. In some embodiments, the extensions are provided on an ISP controlled server in the cloud, an ISP controlled modem or access point, a third party WiFi access point, a third party modem, or ISP provided low latency devices.

In some embodiments, the server extension allows a user to select device applications for different latency treatment. A server within the residence can use classifiers and queues to reduce latency for low latency devices. The server can be part of a router, set top box, hub, etc. in some embodiments. The server extensions support multiparty involvement (e.g., cloud managers, ISPs, application developers and silicon vendors) for end to end usages in some embodiments.

With respect to latency, generally, latency refers to an amount of time a system, application or device takes to process and respond to a request in some embodiments. With respect to low latency, low latency refers to such amount of time being within a threshold, a performance level, a user experience level or requirements of the application or usage in some embodiments. The threshold, performance level, user experience level or requirements of the application may vary based on context, such as a type of application and/or use case and the systems, networks, and computer environment for which such use cases and/or application operate or execute. Low latency from a perspective of a computing environment refers to an ability of a computing system or network to provide responses without unacceptable or unsuitable delay, or otherwise minimal delay, for the context or use case of which such responses are provided. System criteria and application parameters can affect a threshold for low latency. The threshold can be fixed or variable (e.g., depending upon conditions or actual needs or requirements at a particular time). With respect to low latency networks and systems in a context of network and network communication, low latency describes a computer network, systems and environment that is designed, configured and/or implemented to support applications, network traffic and processing operations to reduce, improve latency or to meet a low latency threshold. End-to-end latency refers to latency between two points in a network or communication system. The two points can be a source of data and a consumer of data, or intermediate points therebetween in some embodiments.

A low latency device refers to any hardware, device component, or system that has low latency considerations or requirements in some embodiments. A low latency device can be a telecommunications, remote control systems, gaming, audio processing, financial trading, augmented reality and/or virtual reality device where delays can impact user experience or system performance. There may be levels of low latency requirements where one low latency device has a more stringent requirement than another low latency device in some embodiments. A low latency path refers to a path for low latency operation in some embodiments. Latency data refers to any indication of latency associated with a communication or configuration data for low latency operation or control in some embodiments. A low latency application refers to the use or performance of a low latency operation in some embodiments. A low latency device or software program can be used to perform the low latency operation (video conferencing, cloud gaming, augmented reality/virtual reality (AR/VR) applications, and metaverse applications).

Some embodiments relate to a system including a first device and an application. The application operates on the first device and is configured to append time stamps to a first packet received by the first device. The time stamps indicate a first time the first packet is received by the first device and a second time the first packet is sent by the first device. Append refers to adding or attaching information to a data structure (e.g., a packet) in some embodiments.

In some embodiments, the application is configured to determine latency information associated with communication through the first device using the time stamps. The time stamps include a first time stamp for the first time and a second time stamp for the second time. In some embodiments, the application is configured to provide a second packet including the latency information and communicate the second packet to a server remote from the first device via a virtual communication link. In some embodiments, the first time stamp is an ingress time stamp and the second time stamp is an egress time stamp.

In some embodiments, the time stamps are provided as part of a precision time protocol. In some embodiments, the first packet is for use in a low latency operation. In some embodiments, the time stamps are derived from a satellite time source. In some embodiments, the latency information includes a history of time stamps. In some embodiments, the first device is a user device, cloud infrastructure, internet service provider infrastructure, a set top box, a cable modem, or a wireless router.

Some embodiments relate to a non-transitory computer readable medium having instructions stored thereon that, when executed by a processor, cause a processor to receive a first packet from a first node. The first packet includes latency information associated with a second packet provided to the first node for a low latency application. The instructions also cause the processor to provide a third packet to the first node or other nodes to increase priority for packets for the low latency application if the latency information indicates that a latency threshold for the low latency application has not been met. The first node can be part of a communication system including a cable, fiber optic, or wireless network. The other nodes and the first node are in path associated with the second packet provided to the first node for the low latency application.

In some embodiments, the processor is disposed on a server remote from the first node. In some embodiments, the server is in communication with internet service provider infrastructure and the third packet is provided to the internet service provider infrastructure. In some embodiments, the third packet is provided to internet service provider infrastructure, a set top box, a cable modem, or a wireless router.

In some embodiments, the instructions cause the processor to provide a fourth packet to the first node or the other nodes to decrease priority for packets for the low latency application if the latency information indicates that the latency threshold for the low latency application has been met and additional bandwidth is available.

In some embodiments, the latency information comprises a user identification.

Some embodiments relate to a method of providing low latency service. The method includes providing a first time stamp for a first packet provided to a first device. The first packet can be for reception by a low latency device or as being for use in a low latency operation. The method also includes providing a second packet including latency information to a server remote from the first device via a virtual communication link.

In some embodiments, the method also includes providing a second time stamp for the first packet provided to the first device. In some embodiments, the first time stamp is an ingress time stamp and the second time stamp is an egress time stamp. In some embodiments, the first device includes an application configured to append the first time stamp to the first packet.

Some embodiments relate to a server. The server includes a first application configured to monitor end-to-end latency for a network. The network includes devices. The application is configured to receive latency information from at least one of the devices. The latency information includes time stamps or time period data for a packet to communicated across a device or a link. Monitoring or monitor refers to an action where performance is observed, checked, and/or recorded and can generally occur over a period of time.

A non-transitory computer readable medium have instructions stored thereon that, when executed by a processor, cause the processor to receive a first packet from a first node. The first packet includes latency information associated with a second packet provided to the first node for a low latency application. The instructions also cause the processor to provide a subscription offer in response to the latency information. The first node is part of a communication system comprising a cable, fiber optic, or wireless network. The other nodes and the first node are in path associated with the second packet provided to the first node for the low latency application.

In some embodiments, the first device is a set top box, a cable modem, or a wireless router. A device can refer to any apparatus, system, or component for performing an operation in some embodiments. A low latency device can refer to any device capable of performing a low latency operation. A low latency operation refers to an operation where higher than low latency operation can affect performance level, user experience level or a requirement of the application or use in some embodiments. A packet refers to a unit of data that is transmitted over a network in some embodiments. The packet can include a header and a payload. Time stamps and latency information can be appended to a packet in some embodiments. Classify or classifying may refer to any operation for determining a classification, grouping or arrangement in some embodiments. For example, a packet can be classified as being for a low latency device or application by reviewing an address, appended data, by its type of data, or other information in some embodiments. Bandwidth may refer to an amount of capacity for communication in some embodiments. Priority refers to a precedence, hierarchical order, level, or other classification in some embodiments. For example, packets can be ordered for transmission in accordance with a priority associated with a latency requirement in some embodiments. A cable, fiber optic, or wireless network refers to any network that uses one or more of a fiber optic cable, a coaxial cable, an ethernet cable, other wire, or wireless medium in some embodiments.

A. Communication System

Network latency can significantly impact internet connectivity, user experience, and the performance of various online applications and services. Some embodiments provide information for ISPs to address end-to-end latency issues through network optimization, infrastructure upgrades, and efficient routing to ensure a reliable and responsive internet experience for their customers. In some embodiments, tools are provided so that cloud servers of ISPs can collect analytics data and can re-configure ISP provided devices like cable modems, GPON modems or set top boxes. In some embodiments, the systems and methods allow multiple parties (e.g., more than one ISP, cloud service providers, public switch operators, and application developers) to address low latency usages including but not limited to video conferencing, augmented reality (AR)/virtual reality (VR), and metaverse end to end usage. In some embodiments, the systems and methods allow multiple parties to cooperate and work together to address latency issues. In some embodiments, the systems and methods can be used with WiFi networks, Ethernet networks, modems, access network, backbone networks, IXPs, and cloud infrastructure and allow multiple teams to work together for latency optimizations across various mediums.

In some embodiments, a latency monitor measures and reports latency for each link, device, and end application. The reports are provided to controllers of the paths, such as, ISPs, application developers, end users, etc. so that actions can be taken once low latency requirements are not met. In some embodiments, systems and methods provide a seamless latency monitoring, analysis, and optimization. The analysis of latency measurements and reporting allows for identification of latency contributors in real time and optimization by mapping traffic requiring low latency traffic to low latency queues or paths. In some embodiments, devices in the path are provided with an application (e.g., software) for effecting monitoring, analysis, and optimization. The analysis of latency measurements and reporting allows for control of devices to appropriately provide low latency traffic to low latency queues or paths. The applications can be in communication with a latency server (e.g., a server for the applications) that coordinates operations and accumulates data according to the monitoring, analysis, and optimization operations. An application or app may refer to a software program or module configured to perform specific functions or tasks on an electronic device.

With reference FIG. 1 a communication system 100 includes a network 102A for residences 116A and 118A, a network 102B for residences 116B and 118B, a cloud infrastructure 104, and a BQUICK_TOP server 112. Communication system 100 advantageously is configured so that information is provided to ISPs to address latency issues through network optimization, infrastructure upgrades, service upgrades and/or efficient routing to ensure a reliable and responsive internet experience for customers can be achieved on networks 102A and 102B. BQUICK_TOP server 112 is configured to receive the information and address latency issues in some embodiments. BQUICK_TOP server 112 is in communication (e.g., via direct or virtual connections) with cloud infrastructure 104 and networks 102A and B (residences 116A-B and 118A-B) to share information, reports, commands, and other data in some embodiments. BQUICK_TOP server 112, infrastructure 104 and residences 116A-B and 118A-B can utilize any form of communication mediums, networks, protocols, etc. to communicate data and information.

Cloud infrastructure 104 includes a collection of hardware, software, networking, and other resources that enable the delivery of cloud computing services over the internet in some embodiments. Cloud infrastructure 104 includes physical servers, storage devices, networking equipment, and other hardware components hosted in data centers distributed across multiple geographic locations in some embodiments. The data centers are equipped with high-performance servers, storage arrays, and networking gear to support the computing needs of cloud services in some embodiments. The cloud infrastructure 104 is configured to provide high-speed, redundant network links, routers, switches, and content delivery networks (CDNs) for delivery of low-latency, high-bandwidth content for users in some embodiments. Cloud infrastructure 104 includes block storage (e.g., Amazon EBS, Azure Disk Storage), object storage (e.g., Amazon S3, Google Cloud Storage), and file storage (e.g., Amazon EFS, Azure Files) in some embodiments.

Residences 116A and 118A can include a network associated with a first ISP and residences 116B and 118B can include a network associate with the same ISP or a second ISP. In some embodiments, the networks for residences 116A and 118A and residences 116B and 118B are part of broadband access server (BAS) networks. Network 102A includes infrastructure 106A, a head end 108A, a BQUICK ISP_A server 112A, splitter 114A, equipment for residence 116A and equipment for residence 118A. Equipment for residence 118A includes an optical network unit (ONU) 120, a user device 122, and a television 124. Modem or optical network unit 120 can be a fiber optic router, switch, gateway etc. and have WiFi capabilities for a WiFi network associated with residence 118A in some embodiments. Optical network unit 120 is a GPON modem or optical network terminal (ONT) in some embodiments. GPON is a technology that allows for high-speed internet access over fiber optic cables. Optical network unit 120 converts the optical signals transmitted over the fiber optic cables into electrical signals and/or radio frequency signals that can be used by devices in residence 118A. Although system 100 is shown communicating via coaxial cable and optical cable, ground based wireless communications and satellite communications can be utilized in system 100. Optical network unit 120 is generally provided by an optical network operator (ISP-A) and can be referred to as an optical network termination. BQUICK_TOP server 112 and BQUICK ISP_A server 112A can be Broadcom Analytics System (BAS Servers) that collect analytics data from various devices like modems, set top boxes, and other devices.

User device 122A is a smart phone, AR/VR device, tablet, lap top computer, smart watch, exercise equipment, smart appliance, camera, headphone, automobile, other computing device, etc. Residence 116A can have similar devices to residence 118A. Television 124 and user device 122 communicate with optical network unit 120 via a wireless network or wired connections. In some embodiments, optical network unit 120 can include an ethernet router including wired connections to user device 122, wireless modems, and television 124.

Head end 108A includes routers, switches, servers, and/or other infrastructure for communicating between ISP infrastructure 106A and cloud infrastructure 104. ISP infrastructure 106A includes routers, switches, servers, and/or other infrastructure for communicating between head end 108A and splitter 114A. Splitter 114A communicates via fiber optic cables between infrastructure 106A and residences 116A and 118A. A BQUICK_TOP server 112A communicates with server 112, infrastructure 106A, head end 108A and residences 116A and 118A via direct or indirect communication (e.g., via the Internet).

Splitter 114A is a fiber optic splitter in some embodiments. Splitter 114A can be used in fiber optic networks to divide an incoming optical signal into multiple separate signals for residences 116A and 118A and unify signals into one or more signals for infrastructure 106A. Splitter 114A can be configured for a passive optical network (PON) architecture. Bidirectional communication occurs across splitter 114A in some embodiments. In some embodiments, splitter 114 is a conducting cable-type splitter (e.g., for a coaxial, not optical cable). Splitter 114 includes repeaters, amplifiers, signal conditioners, etc. in some embodiments.

BQUICK ISP_A server 112A a computing device, such as a machine equipped with one or more processors, memory, and storage drives. BQUICK ISP_A server 112A delivers assorted services to customers (e.g., residences 116A and 118A) for the ISP in some embodiments. BQUICK_TOP server 112 is configured as a central hub responsible for managing and routing internet traffic for its subscribers. BQUICK ISP_A server 112A handles requests from users such as accessing websites, sending emails, streaming content, and downloading files. BQUICK ISP_A server 112A manages network protocols, assigns IP addresses, and facilitates communication between different devices on the internet. BQUICK ISP_A server 112A includes operating systems like Linux or Windows Server, along with networking software such as routing protocols (e.g., BGP, OSPF), DNS (Domain Name System) servers, dynamic host configuration protocol (DHCP) servers for IP address allocation, and firewall/security software to protect system 100 from cyber threats. BQUICK ISP_A server 112A employs traffic shaping and quality of service (QOS) mechanisms to prioritize and optimize internet traffic, ensuring a smooth and consistent user experience for all subscribers. These operations can involve managing bandwidth allocation, prioritizing certain types of traffic (e.g., VoIP or video streaming), and mitigating network congestion during peak usage periods and can be performed in response to information from server 112. BQUICK ISP_A server 112A employs monitoring tools or applications to continuously analyze traffic data to detect anomalies, troubleshoot network issues, and ensure compliance with service level agreements (SLAs) and regulatory requirements in some embodiments.

BQUICK_TOP server 112 is a computing device similar to and is configured to communicate with servers 112A and 112B. BQUICK_TOP server 112 includes software advantageously configured to address latency issues through network optimization, infrastructure upgrades, and efficient routing to ensure a reliable and responsive internet experience for their customers in some embodiments. BQUICK_TOP server 112 can receive logs of network activity, including but not limited to traffic patterns, usage statistics, and security events from servers 112A and 112B in some embodiments. BQUICK_TOP server 112 employs monitoring tools to continuously analyze traffic data to detect anomalies, troubleshoot network issues, and ensure compliance with service level agreements (SLAs) and regulatory requirements in some embodiments. In some embodiments, BQUICK_TOP server 112 is a platform configured to perform latency monitoring in real time, latency analysis in real time, and latency optimization in real time. In some embodiments, the latency optimization is performed to provide a report indicating latency issues. BQUICK_TOP server 112 can configure paths in networks 102A and 102B and controls devices in networks 102A and 102B so that low latency requirements are met in some embodiments.

BQUICK ISP_B server 112B is similar to BQUICK ISP_A server 112A and is configured for operation with residences 116B and 118B. Residences 116A, 118A, 116B and 118B are similar to each other and can include similar devices. Residence 118B includes a cable modem 130B, a set top box 136B, a game controller 138, a television 134 and a user device 132. User device 132 is similar to user device 122. Head end 108B is similar to head end 108A, and ISP infrastructure 106B is similar to ISP infrastructure 106A. Televisions 124 and 134 are monitors, smart televisions, or other audio/video equipment. Networks 102A and 102B can include cameras, security equipment, fire and safety equipment, smart appliances, etc. in communication with infrastructure 106A and 106B in some embodiments. ISP infrastructure 106A and 106B can each include fiber optic cable, coaxial cable, remote nodes, splitters, and other equipment for cable customers in some embodiments. The equipment can include amplifiers, remote physical devices or layers and remote media access control devices or layers. Intermediate nodes in ISP infrastructure 106A and 106B can process data packets and monitor latency and traffic at various points in network. BQUICK_TOP server 112, BQUICK ISP_B server 112B, BQUICK_ISP_A server 112A are controlled by ISPs (e.g., respective ISPs) in some embodiments.

ISP infrastructure 106B is coupled to residences 116B and 118B via a coaxial cable in some embodiments. Cable modem 130B is a device configured to connect devices in residence 118B to the ISP infrastructure 106B. Cable modem 130 includes a computer, router, gateway, or other communication device in some embodiments. Modem 130 can be configured to provide a wireless network for communicating with devices in residence 118B. Repeaters, amplifiers, signal conditioners, etc. can be provided on the cable associated with modem 130 in some embodiments. Cable modem refers to any device for communicating across a cable in some embodiments. Optical network unit 120 and modem 130 provide data connection to the ISPs data pipe over fiber or cable. All devices inside the home can be connected to the modem over WiFi or Ethernet for internet connectivity. Each node (e.g., routers, repeaters, modems, WiFi access points) inside the home can introduce latency. ONU 120 and modem 130 can be any device at a home or business that connects networking devices to ISPs provided internet data pipe over coaxial cable, fiber optic cable or digital subscriber line (DSL) or cell connection (e.g., via a tower (e.g. 5G, LTE modem)) in some embodiments.

Set top box 136 is configured to receive and decode digital television signals for viewing on television 134. Set top box 136 can be configured for gaming operations and can communicate with a game controller 138. Set top box 136 can also be configured to provide internet access, shopping services, home automation, audio features, screen mirroring, etc. Set top box 136 includes one or more processors, memory, dedicated graphics processing units (GPUs), and/or storage capacity for storing games, applications (apps), latency data, and recorded content in some embodiments. Set top box refers to any device that connects to a television set or monitor and allows users to receive and decode video signals. A set top box can serve as an interface between a television set and various broadcast media sources, such as cable, satellite, or internet-based streaming services in some embodiments. A dashed line in the drawings can represent a virtual connection and a solid line can represent a physical connection (e.g., wires or fiber optic cable).

The cloud infrastructure 104, head end 108A, and head end 108B are in communication with the internet 109 virtually or directly. Head end 108A and head end 108B can be associated with buildings 111A and 111B, respectively. Communication system 100 is generally an end to end combination of networking elements used for networking traffic from a home or business to internet 109 (e.g., public internet) in some embodiments. In some embodiments, cloud infrastructure 104 is a set multiple servers, switches, storage units. ISPs can have pool of data center/cloud servers co-located with head ends 108A and 108B or dedicated links to cloud infrastructure 104 from head ends 108A and 108B and head end connections to internet 109.

Although cloud infrastructure 104 is shown as single block, cloud servers, data servers can be collocated with ISP head ends 108A and/or 108B. The cloud servers can be at third party private facility and ISPs can have dedicated physical links or links via internet 109. Depending on congestion and server processing capabilities, cloud infrastructure 104 can be a source of latency. Cloud server processing elements can be upgraded to support latency monitor applications (E.g., BQUICK applications) or can configure devices to support low latency services in some embodiments. Head ends 108A and 108B can be a central facility (e.g., a central office. A head end refers to a facility where internet data or audio/video content is received, processed, and routed to end subscribers like residential or business owners in some embodiments. Head ends 108A and 108B can have multiple switching, routing, data metering, queuing, security elements, and/or other devices which can introduce the latencies. Head ends 108A and 108B can also host Cable Modem Termination Systems (CMTS) in a cable network, DSLAM (Digital Subscriber Line Access Multiplexor) in a DSL network. and OLT (Optical Line Terminal) in a fiber network.

Networks 102A and 102B is operated by one of as ISP-A and ISP-B. ISPs extend their services to various residences or businesses within communities, cities, or specific regions. Networks 102A and 102B represents two distinct networks served by same or different ISPs, which may be situated in the same neighborhood or entirely different regions or countries. Homeowners or business proprietors seek out ISPs offering services in their local areas and subscribe to internet service accordingly.

B. Applications

System 100 advantageously includes an ISP infrastructure BQUICK application 156A for ISP infrastructure 106A, a head end BQUICK application 158A for head end 108A, a modem BQUICK application 120A for optical network unit 120, a user device BQUICK application 122A for user device 122, and a television BQUICK application 124A for television 124. Applications 156A, 158A, 120A, 122A, and 124A can be software apps or programs designed to perform specific tasks or provide particular functions as described herein (e.g., latency monitoring, latency analysis, and latency optimization and the communication and storage of data related thereto). Applications 156A, 158A, 120A, 122A, and 124A can be provided on any electronic devices in communications system 100 including but not limited to servers, computers, smartphones, tablets, smart devices, appliances, cameras, security devices, vehicles, user devices, and other digital platforms. In some embodiments, applications 156A, 158A, 120A, 122A, and 124A can be executed on Windows, macOS, IOS, Android, or other operating systems or can be web-based and accessible through internet browsers. In some embodiments, applications 156A, 158A, 120A, 122A, and 124A can be cross-platform with an ability to be executed on multiple OS environments. Applications 156A, 158A, 120A, 122A, and 124A can be installed from various sources such as app stores, software repositories, or directly from ISP's website. In some embodiments, applications 156A, 158A, 120A, 122A, and 124A are configured to communicate with BQUICK_TOP server 112 via a virtual connection. In some embodiments, applications 156A, 158A, 120A, 122A, and 124A are configured to communicate with BQUICK_TOP server 112 via BQUICK ISP_A server 112A. Applications 156A, 158A, 120A, 122A, and 124A can be updated through app stores or via automatic updates depending on device settings.

BQUICK applications 156A, 158A, 120A, 122A, and 124A are configured to facilitate integration and communication with other services or platforms, sharing of data, collaboration, and/or access to additional functionalities seamlessly. Applications 156A, 158A, 120A, 122A, and 124A allow optical network unit 120, television 124 and user device 122 to monitor latency, store subscription information (e.g., classic bandwidth in Megabits per second (MPPS), monitor low latency bandwidth (MBPS), max jitter in milliseconds), and provide options for upgrading internet service. The latency information and subscription information can be tracked according to device, device type, user identification, application, residence identification, etc. in some embodiments. The latency information can be provided in a packet with a time stamp to BQUICK_TOP server 112 in some embodiments. A user interface can be provided by applications 156A, 158A, 120A, 122A, and 124A on optical network unit 120, television 124 and user device 122 to upgrade or downgrade to a different level of service in light of latency information. The different level of service can be provided to BQUICK_TOP server 112, BQUICK ISP_A BQUICK server 112A, or BQUICK ISP_B server 112B in some embodiments.

System 100 advantageously includes an ISP infrastructure BQUICK application 156B for ISP infrastructure 106B, a head end BQUICK application 158B associated with head end 108B, a modem BQUICK application 130B for modem 130, and a set top box BQUICK application 136B for set top box. Applications 156B, 158B, 130B, and 136B are similar to applications 156A, 158A, 120A, 122A, and 124A. In some embodiments, when applications 130B, 136B, 156A, 156B, 158B, 158A, 120A, 122A, and 124A are installed or associated devices join the network, the applications 130B, 136B, 156A, 156B, 158B, 158A, 120A, 122A, and 124A register at server 112 as being compliant for operations described herein. User device 132, television 134, and game controller 138 can also include an application similar to BQUICK applications 122A and 124A.

In some embodiments, BQUICK applications 130B, 136B, 156A, 156B, 158B, 158A, 120A, 122A, and 124A are latency applications and are configured to communicate data so that a topology report can be provided. The topology report identifies devices/networks from end-to-end. Latency requirements of each device is provided in the report (e.g., on a device by device, type of usage by type of usage, user ID by user ID, or application by application basis) in some embodiments. The report can be stored at \server 112 in some embodiments. The latency requirements across the topology can be used to shape traffic, prioritize flow, etc. In some embodiments, the report tracks which devices are offline so that bandwidth reserved for those devices can be used for another device in some embodiments. In some embodiments, the report tracks whether the device is not running a low latency (e.g., BQUICK) application and yet is online so that bandwidth reserved for that device can be used for other devices in some embodiments. Offline refers to a state where a device, system, or application is not actively communicating with other devices or accessing online resources in some embodiments. A device that is off or asleep is offline in some embodiments. A low latency application can be offline when the low latency application is not running in some embodiments.

In some embodiments, the low latency packets are marked so that applications 130B, 136B, 156A, 156B, 158B, 158A, 120A, 122A, and 124A can process the packets and flow as a low latency flow. In some embodiments, the end device (e.g., application 124A) can send a command or request indicating that latency requirements are not being met and each application in the path (applications 120A 156A, and 158A) can respond to that command to process the packets for that device at a higher priority or remove traffic from that path in some embodiments. Latency issues can be sourced from an AP, a mesh, a device, or a node. Tracking bit rates or latencies at each location allow solutions to be directed to the particular location of the latency issue.

Figure 2:
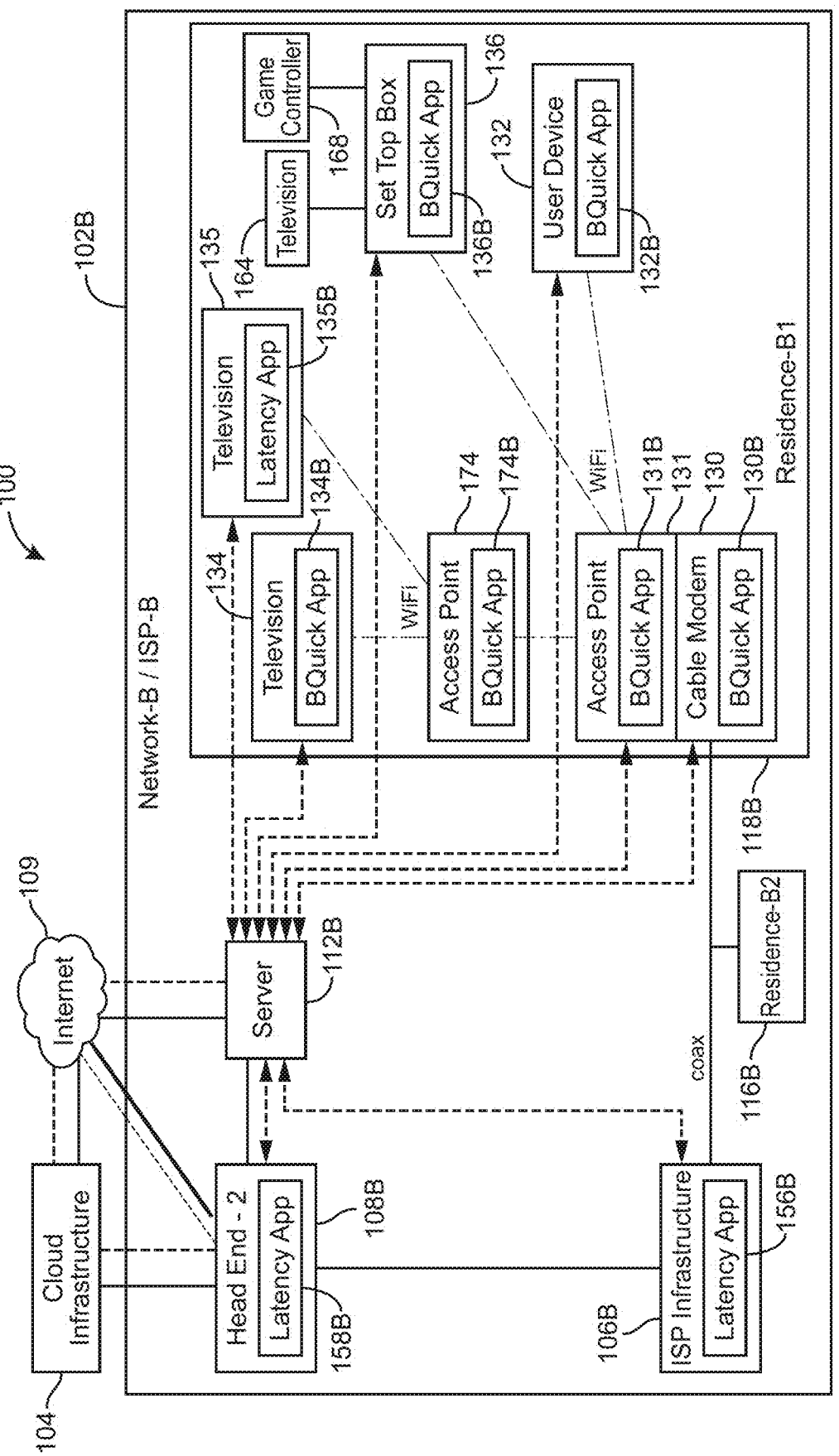
FIG. 2 is a general schematic block diagram of portion of the communication system illustrated in FIG. 1 according to some embodiments.

With reference to FIG. 2, residence 118B can include an access point 131 in communication with modem 130, a wireless router 174 in communication with television 134, a television 135, set top box 136, and user device 132. Access point 131 can be integrated with modem 130 or can be a separate unit. User device 132 includes a user device BQUICK application 132B, and access point 131 includes a latency access point application 131B. Router 174 includes a wireless router BQUICK application 174B, television 134 includes a television BQUICK application 134B, and television 135 includes a television BQUICK application 135B. BQUICK_TOP server 112, BQUICK_ISP_A server 112A, and BQUICK_ISP_B server 112B are in virtual communication with applications 130B, 131B, 136B, 174B 132B, 134B, 135B, 156B, and 158B in some embodiments. A server refers to any computing device that provides services or resources to other computers or clients within a network in some embodiments.

Applications 130B, 131B, 136B, 174B, 132B, 134B, 135B, 156B, and 158B are similar to applications 156A, 158A, 120A, 122A, and 124A. Applications 130B, 131B, 136B, 174B, 132B, 134B, 135B, 156B, and 158B allow modem 130, televisions 134 and 135, access point 131, router 174, set top box 136, and user device 132 as well as other cable modem termination systems to monitor latency, store subscription information (e.g., classic bandwidth in Megabits per second (MPPS), low latency bandwidth (MBPS), max jitter in milliseconds), and provide options for upgrading internet service. A user interface can be provided on optical network unit 120, television 124 and user device 122 to upgrade or downgrade to a different level of service in light of latency information. This ability is available even if the devices are third party devices in some embodiments. In some embodiments, application 131B or 174B can be configured to update network topology information to BQUICK TOP server 112, and applications 130B, 131B, 136B, 174B, 132B, 134B, 135B, 156B, and 158B can monitor low latency resources, request services, register devices, and request different latency treatment (e.g., for video, audio, commands, downloads, etc.). In some embodiments, devices or nodes associated with applications 130B, 131B, 136B, 174B 132B, 134B, 135B, 156B, and 158B can include algorithms for changing packet priority with time and latency requirements. Applications 130B, 131B, 136B, 174B, 132B, 134B, 135B, 156B, and 158B can communicate using virtual or logical connections (e.g., using internet 109).

Access point 131 is a networking device that allows Wi-Fi-enabled devices to connect to a wired network. Access point 131 serves as a bridge between wireless devices, such as wireless router 174, set top box 136, user device 132, televisions 134 and 135, and the wired network infrastructure, such as, modem 130, routers, switches, and servers, in some embodiments. Wireless router 174 can be a networking device that provides a wireless access point for a wireless network. Wireless router 174 serves as a hub for a wireless local area network (LAN), allowing multiple devices in or around residence 118B to connect to the internet and communicate with each other. Wireless router 174 can include wirelessly built-in Ethernet switches which provide multiple ports for connecting wired devices. A wired connection can connect router 174 to access point 131 or modem 130 in some embodiments. Wireless router refers to any device that provides a wireless access point for a wireless network in some embodiments.

Figure 3:
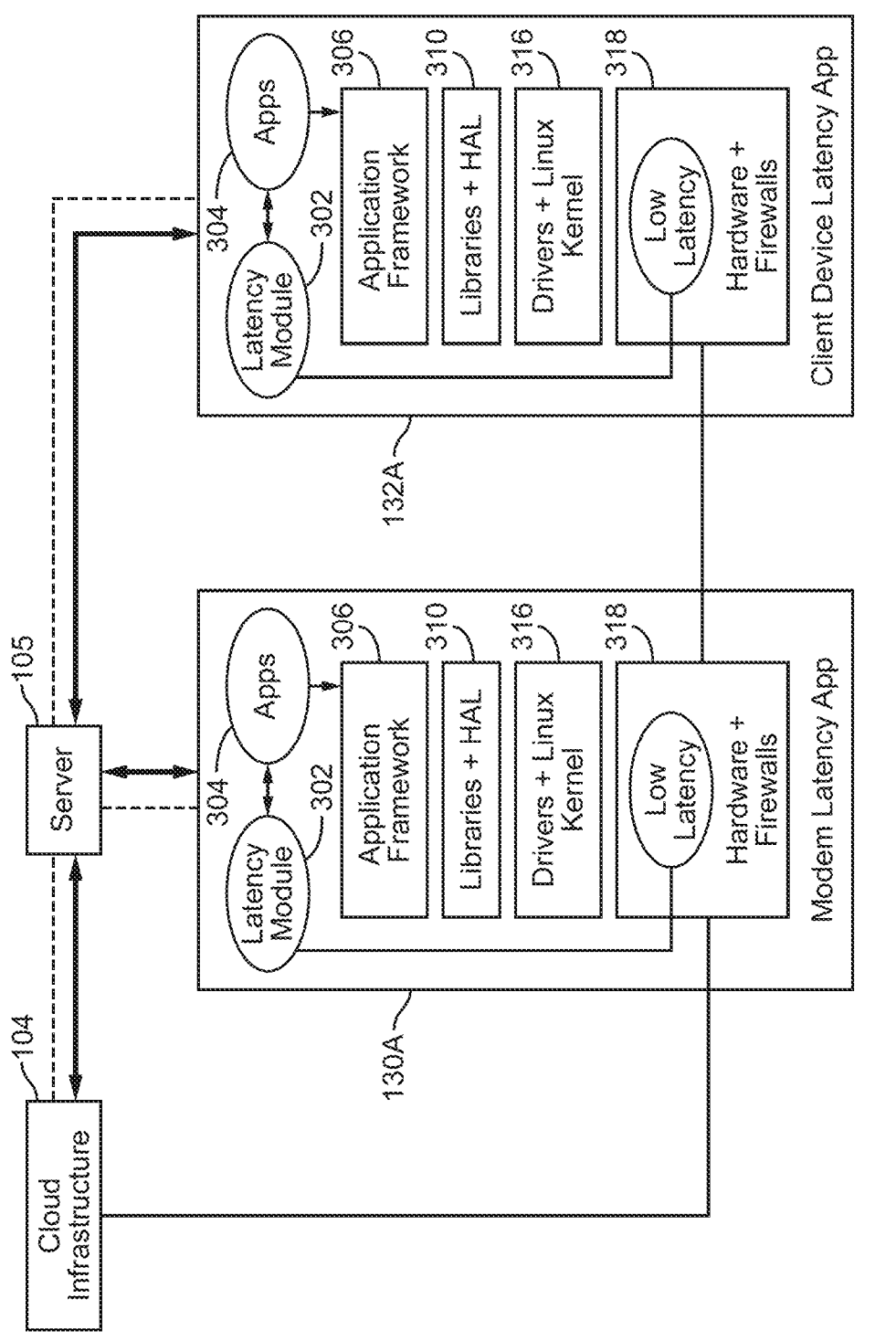
FIG. 3 is a general schematic block diagram of applications in communication with cloud infrastructure for the communication system illustrated in FIG. 1 according to some embodiments.

With reference to FIGS. 2-3, applications 130B and 132B are in communication with BQUICK_TOP server 112 via a logical interface. The architecture of applications 130B and 132B can be used in any of applications 131B, 136B, 174B 134B, 135B, 156B, 158B, 156A, 158A, 120A, 122A, and 124A. The logical interface is a virtual interface that represents a specific network configuration or functionality within a networking device, such as modem 130 or user device 132. The logical interface is software defined and can be created, configured, and managed within the device's operating system in some embodiments. Applications 130B and 132B can be provided with modems, routers, access points, mesh devices, set top boxes, AR/VR devices, game consoles, phones, over the top devices (OTTs), etc. Applications 130B, 132B, and cloud infrastructure 104 can communicate using app to app communication. App to app communication is an exchange of data, messages, or commands between two or more software applications running on the same device or different devices over a network in some embodiments. App to app communication enables seamless integration and collaboration between different apps, allowing them to share information, trigger actions, or synchronize state without requiring user intervention in some embodiments. BQUICK_TOP server 112 can include an application for monitoring and/or determining end to end latency.

In some embodiments, applications 120A, 124A, 132B, 134B, 135B, 136B, and 132B are client level applications. Applications 136B can be configured for highest priority (e.g., lowest latency applications) while ordinary streaming latencies are associated with applications 120A, 124A, 132B, 134B, 135B, 132B. Applications 174B and 131B are node level application and can be configured to provide or assign priority for applications 120A, 124A, 132B, 134B, 135B, 136B, and 132B (client level applications) and associated devices. Application 130B can be configured to provide or assign priority between application 136B, applications 174B and 131B (e.g., node level applications), and applications 120A, 124A, 132B, 134B, 135B, and 132B (e.g., client level applications) as well as their associated devices. Cloud level applications can include applications 156B and 158B in some embodiments. In some embodiments, the partitioning of applications 156B, 158B, 120A, 124A, 130B, 132B, 134B, 135B, 136B, 174B, and 132B allows for segregation of local and cloud processing, reduction in cloud server communication and ISP bandwidth, local data storage and security, availability of local resources (including edge processing and filtering of information), and faster response to low latency devices. In some embodiments, application 130B has a server extension and handles communication between server 112 and applications 120A, 124A, 132B, 134B, 135B, 136B, and 132B.

When application 130B includes the server extension, application 130B can be a client level application or a cloud level application and maintain a virtual connection to server 112 in some embodiments. The server extensions can provide advantages of decoupling development from ISPs which can be helpful for standardization, of having a direct data path from application 120A or 131B to app developer servers, of maintaining local data privacy, of availability of local resources (e.g., local machine learning (ML), edge processing and filtering information), and of faster response to local low latency gadgets or devices in some embodiments.

In some embodiments, applications 156B, 158B, 120A, 124A, 130B, 132B, 134B, 135B, 136B, 174B, and 132B can achieve synchronization of the wall clock across all nodes and end user devices. Applications 156B, 158B, 120A, 124A, 130B, 132B, 134B, 135B, 136B, 174B, and 132B utilize timestamps for low-latency data packets at each node. This enhancement enables the determination of latency at each node and reporting to server 112 in some embodiments. By utilizing a precision time protocol (PTP), applications 156B, 158B, 120A, 124A, 130B, 132B, 134B, 135B, 136B, 174B, and 132B can distinguish whether latency arises from the home network, an ISP, or cloud servers using time stamps in some embodiments. Each device can have an associated PTP clock that communicates with the application associated with the device. The latency per node can be shared across networks so that networks can avoid devices having latency issues or can perform other operations to reduce latency at that node (e.g., divert higher latency traffic away from the node having issues). The PTP clock can be derived form a satellite clock in some embodiments.

With reference to FIG. 3, applications 130B and 132B each include a latency module 302, applications 304, an application framework 306, libraries and hardware abstraction layer 310, drivers and linux kernel 316, and hardware and firewalls 318. In some embodiments, latency module 302 is configured to control and monitor hardware and firewalls based upon latency. Latency module or BQUICK module 302 is software configured to provide the low latency operations described herein. Applications 304 are apps for performing various operations and can include third part apps (e.g., android package kit (APK)). Application framework 306 is a structured set of software components that provide the necessary infrastructure for building and running applications.

Libraries and hardware abstraction layer 310 provides standardized interfaces for device drivers to interact with hardware components. Libraries and hardware abstraction layer 310 allows applications and system services to access hardware functionalities in a consistent manner across different devices. Libraries and hardware abstraction layer 310 provide collections of pre-written code that developers can use to perform common tasks or implement specific functionalities and generally contain reusable functions, classes, or modules that provide specific capabilities.

Drivers and linux kernel 316 serves as the bridge between the hardware and the software layers of the system, managing system resources in some embodiments. Drivers and linux kernel 316 provide essential services and facilitate communication between software processes and hardware devices in some embodiments. Drivers and linux kernel 316 includes software components that facilitate communication between the operating system (OS) and hardware devices in some embodiments.

Figures 4, 5:
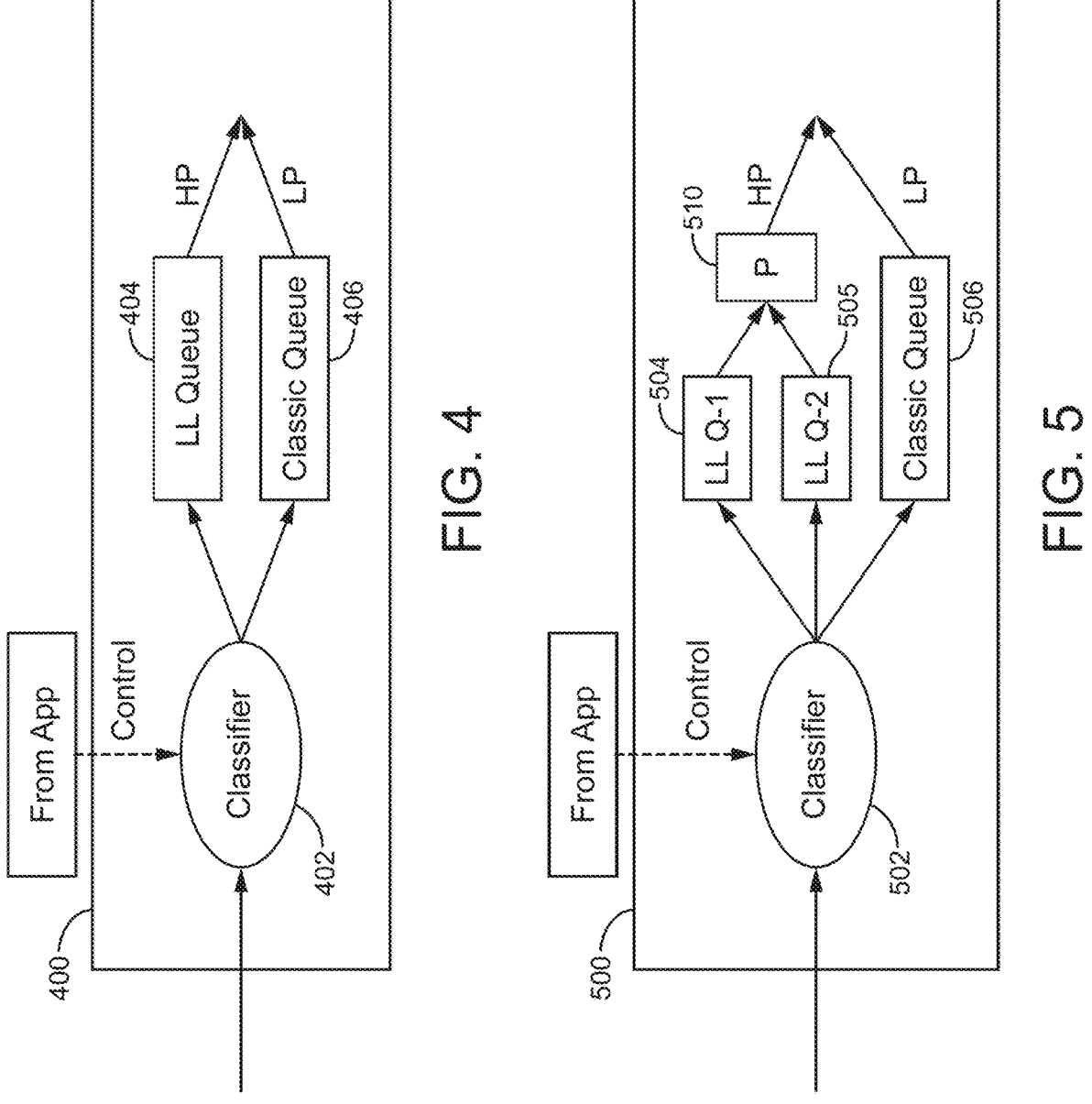
FIG. 4 is a general schematic flow diagram of an operation for the communication system illustrated in FIG. 1 according to some embodiments.
FIG. 5 is a general schematic flow diagram of an operation for the communication system illustrated in FIG. 1 according to some embodiments.

With reference to FIG. 4, a function, service, process, or operation 400 can controlled by any of applications 130B, 131B, 136B, 174B, 132B, 134B, 135B, 156B, 158B, 156A, 158A, 120A, 122A, and 124A (FIGS. 1 and 2). Operation 400 uses a classifier 402, a low latency queue 404, and a classic queue 406. Queues 404 and 406 are memory or data structures used to manage the flow of packets or messages within a network device or system 100 (FIG. 1). Queue 404 is associated with a high performance path, and queue 406 is associated with a low performance path in some embodiments. A queue refers to any structure for storing information (e.g., packets) in some embodiments. Any networking device can have separate queue to support low latency traffic and operation can be performed any device in communication system 100 (FIG. 1). applications 130B, 131B, 136B, 174B, 132B, 134B, 135B, 156B, 158B, 156A, 158A, 120A, 122A, and 124A can report latency for each queue independently.

Queues 404 and 406 are configured as first-in-first-out (FIFO) buffers that temporarily hold packets or messages before messages are transmitted or processed in some embodiments. Queue 404 can store messages for the high performance path (e.g., low latency path), and queue 406 can store messages for the low performance path (e.g., high latency path) in some embodiments. In some embodiments, a low latency operations may use a low performance path, and a high latency operations may use the high performance path, or each uses the same path. A path refers to any communication route or channel through which data or information travels from a source to a destination (e.g., through devices and across mediums) in some embodiments. A path can include intermediate components and links involved in transmitting data between two or more points in one or more networks in some embodiments. A low latency path refers to a path for low latency traffic in some embodiments.

Classifier 402 is processor and/or software configured to categorize or classify network traffic based on certain criteria (e.g., by latency requirements and/or priority). Classifier 402 is configured to enforce network policies, prioritize traffic (e.g., for the high performance or low performance path), and/or apply specific actions based on the classification results in some embodiments. Classifier 402 is used to differentiate between different classes of traffic (e.g., voice, video, data) and apply QoS policies to ensure that critical applications receive adequate bandwidth and latency requirements. Classifier 402 prioritizes traffic based on predefined criteria, ensuring that important or time-sensitive applications receive preferential treatment over less critical traffic by appropriately providing traffic to queue 404 and queue 406. Classifier 402 can utilize information about customer subscriptions (e.g., device level, user level, residence level) to classify traffic in some embodiments.

With reference to FIG. 5, an operation 500 can be controlled by any of applications 130B, 131B, 136B, 174B, 132B, 134B, 135B, 156B, 158B, 156A, 158A, 120A, 122A, and 124A. Operation 500 is similar to operation 400 and utilizes a classifier 502, a first low latency queue 504, a second latency queue 505, a classic queue 506, and a priority queue 510. Queues 504, 505, 506 and 510 are memory or data structures used to manage the flow of packets or messages within a network device or system 100 (FIG. 1). Queues 504 and 505 are associated with a high performance path, and queue 506 is associated with a low performance path in some embodiments. Queue 510 receives messages from queues 504 and 505 and provide messages or data to the high performance path based upon a priority scheme associated with queues 504 and 505 in some embodiments. Classifier 502 is similar to classifier 402 and is configured to categorize or classifying network traffic based on certain criteria (e.g., by latency requirements) for queues 504, 505, and 506 in some embodiments. In some embodiments, classifiers 402 and 502 are software modules operating on a device (e.g., server, ISP supplied device, user device, etc.). In some embodiments, queues 404, 406, 504, 505, 506 and 510 are virtual queues provided on the memory of the device configured by operation 400 or 500. In some embodiments, queues 404, 406, 504, 505, 506 and 510 are dedicated hardware queues (e.g., FIFO memories) on the device. Classifiers 502 and 402 and queues 404, 406, 504, 505, 506 and 510 are implemented in an application layer of the device and may utilize services and structures provided by the media access layer and the physical layer in some embodiments. Classifiers 402 and 502 can be configured by commands provided by BQUICK TOP server 112 to appropriately classify low latency traffic in some embodiments.

In some embodiments, applications 400 and 500 are configured to operate at nodes associated with devices including but not limited to ONU 120, modem 130, set top box 136, television 124, access point 131, user device 132, and/or router 174. Applications 400 and 500 are configured to control and/or partition subscribed low latency bandwidth traffic (e.g., 20 Mbps vs 50 Mbps), track latency statistics (e.g., minimum, maximum, average latencies for low latency flows), process five tuples (e.g., source IP address, source port, destination IP address, destination port, transport protocol) for X number of flows (where X is any integer) with latency and/or bandwidth requirements, monitor latency introduced by a node, provide timestamps at ingress and egress ports, monitor buffer depths, perform boundary clock precision protocol (e.g., IEEE 1588-2008 standard and extensions thereof), and prioritize of traffic among multiple low latency clients. Monitored and measured information can be appended to packets for provision to other nodes and servers (e.g., server 112). For example, time stamps can be applied to packets at each node or device. Latency can be determined by comparing time stamps. Applications 400 and 500 are also configured to track status of low latency applications and provide a user interface for controlling low latency configurations in some embodiments. Classifiers 402 and 502 and/or queues 404, 406, 504, 505, 506 are configured by applications 130B, 131B, 136B, 174B, 132B, 134B, 135B, 156B, 158B, 156A, 158A, 120A, 122A, and 124A (e.g., at each respective node) in some embodiments. In some embodiments, servers 112, 112A, and 112B configure classifiers 402 and 502 and/or queues 404, 406, 504, 505, 506 via virtual connections.

Applications 400 and 500 can identify end to end bandwidth available for low latency applications, provide a user real time feedback of monitored latency, and adjust latency responses. The adjustment may be in response to purchased services or bandwidth upgrades in some embodiments. In some embodiments, applications 400 and 500 can be configured to provide an advertisement or customer offer for low latency resources. Applications 400 and 500 can address variable latency for each user and adjust response for the latency level at a particular time, for a particular time period, etc. Latency information can be communicated to servers 112A, 112B, and 112 and applications 130B, 131B, 136B, 174B, 132B, 134B, 135B, 156B, 158B, 156A, 158A, 120A, 122A, and 124A as timestamps appended to packets as described herein, or to a packet identifier (e.g. 5 tuples and sequence number) in some embodiments. The time stamp information can be sent to servers 112A, 112B, and/or 112 via an independent virtual/logical channel in some embodiments.

Figure 6:
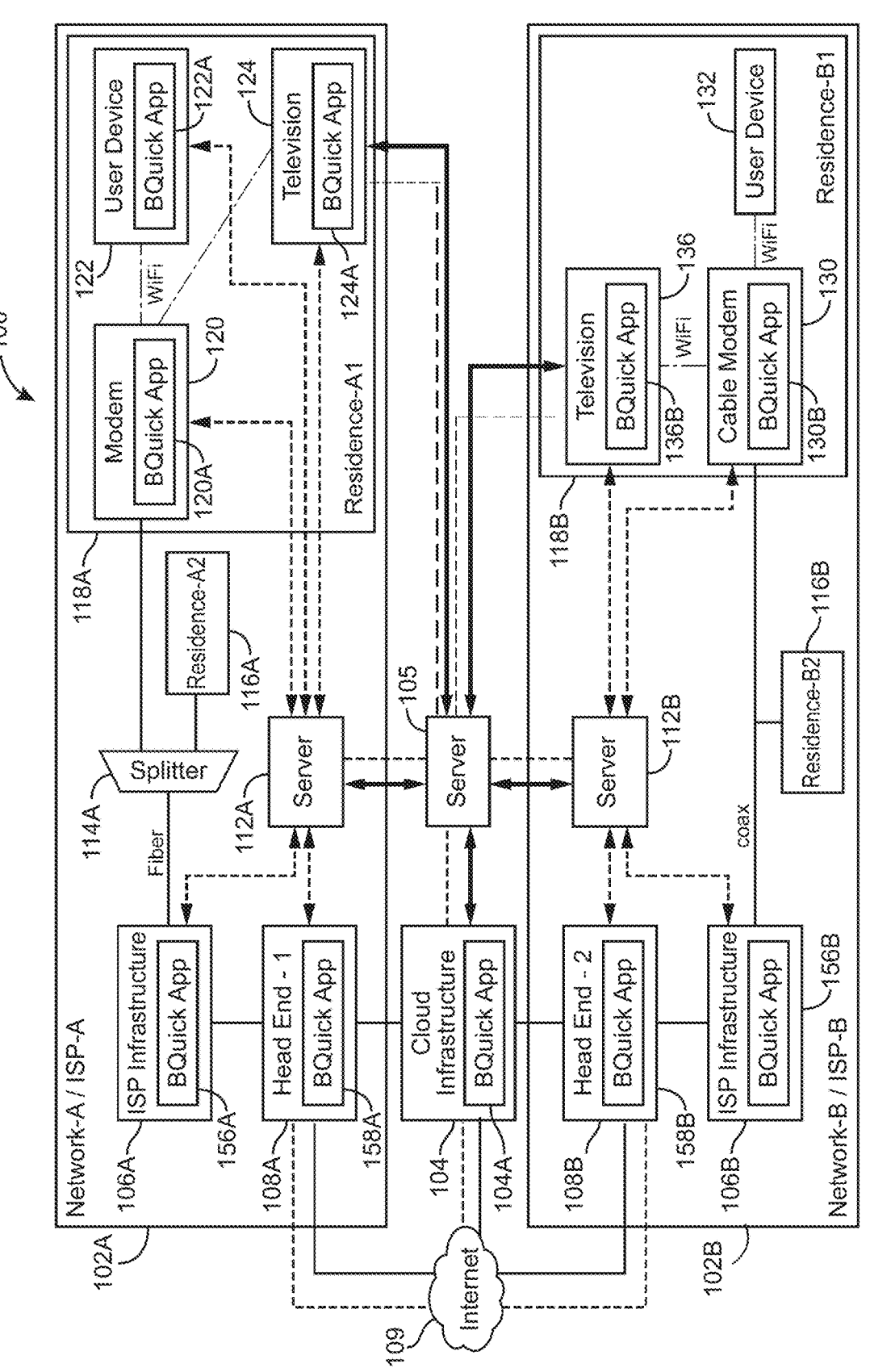
FIG. 6 is a schematic block diagram of the communication system illustrated in FIG. 1 including a server configured for augmented reality/virtual reality and/or metaverse applications according to some embodiments.

With reference to FIG. 6, cloud infrastructure 104 can include an application 104A. Application 104A is similar to applications 130B, 131B, 136B, 174B 132B, 134B, 135B, 156B, and 158B. BQUICK TOP server 112 can be config- ured to monitor AR/VR applications and/or metaverse appli- cations. An application executed on BQUICK TOP server 112 can perform the monitoring functions. Application 104A is in communication with BQUICK TOP server 112. Servers 112A and 112B can include an application similar to appli- cation 104A.

Using applications, 120A, 124A, 130B, 132B, 134B, 135B, 136B, 174B, and 132B, the devices given by ISPs, customer-owned AR/VR setups, mobile phones, over the top (OTT) devices, and cloud gaming clients are capable of facilitating low latency uses. Applications, 120A, 124A, 130B, 132B, 134B, 135B, 136B, 174B, and 132B allow devices in residences 118A and 118B to interact with the server extension integrated in the ONU 120 and modems 130 or routers (e.g., ISP provided). Additionally, the server extensions have the ability to filter and transmit all necessary information to servers 112A and 112B or share open data with application developers.

Use of PTP Protocol

Figure 7:
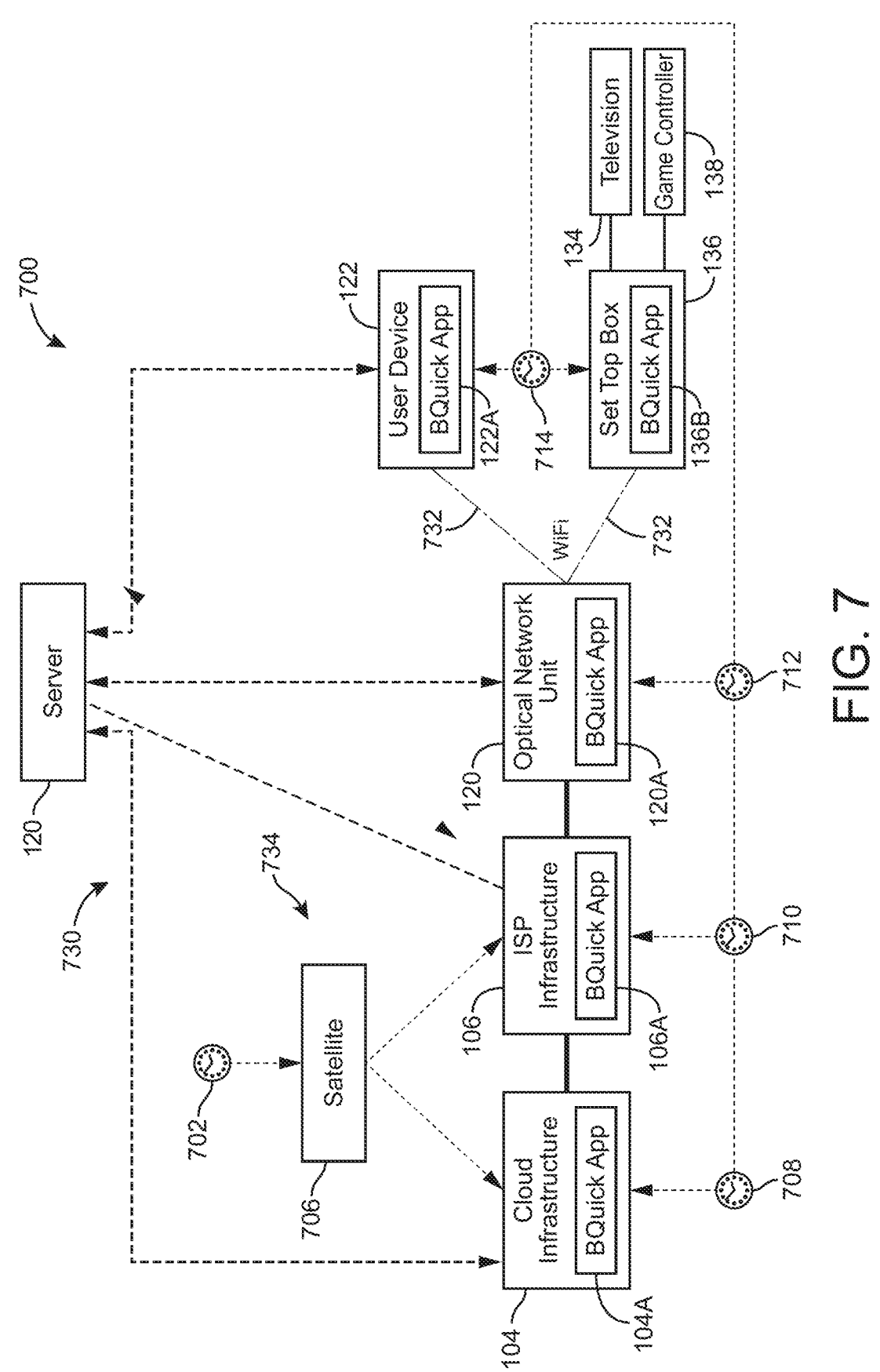
FIG. 7 is a schematic block diagram of a portion of the communication system illustrated in FIG. 1 showing operations using a precision time protocol (PTP) protocol according to some embodiments.

With reference to FIG. 7, a portion 700 of communication system 100 (FIG. 1) includes cloud infrastructure 104, BQUICK TOP server 112, optical network unit 120, user device 122, and television 124. Infrastructure 104 includes BQUICK application 104A, optical network unit 120 includes BQUICK application 120A and user device 122 includes application 122A. Infrastructure 106 can include a head end in some embodiments. A wireless network 732 can be provided for modem 130, set top box 136 and user device 122. BQUICK applications 104A, 120A and 122A can be configured to use the PTP or other time protocol and send latency information in some embodiments. In some embodi- ments, applications 156A and 136B can also be configured to use the PTP or other time protocol and send latency information. In some embodiments, other timing references or protocols can be utilized including but not limited to a device free running clocks, internal clocks, server clocks, time stamp counters at each node, time stamps from other sources, etc. Various time synchronization techniques can be utilized in some embodiments.

Communication system 100 advantageously is configured so that end-to-end latency is tracked from infrastructure to user device 122 or optical network unit 120. In some embodiments, set top box 136 includes application 136B and latency is tracked to set top box 136. Time stamps 708, 710, 712, and 714 using a PTP clock reference 702 from satellite 706 are appended to packets sent from infrastructure 104 to user device 122 or optical network unit 120. In some embodiments, time stamps 708, 710, 712, and 714 using PTP clock reference 702 from satellite 706 are appended only to low latency packets sent from infrastructure 104 to user device 122 or optical network unit 120. Time stamps 708 and 710 are communicated to infrastructure 104 and infrastructure 106 using a link 734 to satellite 706. Time stamps 712 and 714 are communicated from infrastructure 106 to optical network unit 120, set top box 136 and user device 122 via wireless network 732 and virtual connections 736. A time stamp refers to data indicating an approximate absolute or relative time of an event in some embodiments. Timestamp counters at each node can be synchronized to PTP as per IEEE 1588. As PTP timestamps are synchronized to a wall clock, i.e. for same packet once timestamps are collected at various nodes, latency can be indicated at various links rather than just at devices. Application 136A can timestamp a packet with $i\_TS_{136}$ for set top box 136, and application 1536A can time stamp the same packet with $i\_TS_{106A}$ for ISP infrastructure 106A. BQUICK_TOP server 112 can calculate latency due to ISP controlled nodes equal to $i\_TS_{136}$ minus $i\_TS_{106A}$ in some embodiments. In this example, ISP infrastructure 106 A can include a Head End, ONU and STB as ISP controlled devices.

BQUICK applications 104A, 156A, 120A, and 122A compare time stamps 708, 710, 712, and 714 at egress and ingress at each node and append the time stamps 708, 720, 712, and 714 to the packet to determine latency in some embodiments. For example, for ISP infrastructure 106A, a timestamp at the input_is $i\_TS_{106A}$ a timestamp at the output is $o\_TS_{106A}$. Latency introduced by infrastructure 106A for each packet is monitored at infrastructure 106A itself, or raw timestamps are sent server 112. An ingress time stamp refers to a data indicating an approximate absolute or relative time of a frame being received at a node in some embodiments. An egress time stamp refers to a data indicating an approxi- mate absolute or relative time of a frame being transmitted from a node in some embodiments. In some embodiments, the time stamps 708, 720. 712, and 714 are appended on a periodic basis (e.g., every tenth packet) to save bandwidth. Applications 104A, 120A, and 122A can append a summary (e.g., a history) of all time stamps 708, 720. 712, and 714 to the packet or provide a delta of time stamps 708, 720. 712, and 714 across each node in some embodiments. The packets with the appended time stamps 708, 720. 712, and 714 or the summary of the time stamps 708, 720. 712, and 714 and/or deltas associated therewith can be provided by a virtual connection (e.g., virtual connections 736 to BQUICK TOP server 112 in some embodiments. The history of time stamps can be created by processing the time stamps pre- viously appended to the packet be nodes in the path in some embodiments.

BQUICK TOP server 112 can control infrastructure 104, infrastructure 106, optical network unit 120, user device 122, and set top box 136 via virtual connections 736 to achieve appropriate latency. The control can include chang- ing priority of streams, providing different paths for packets, instructions to use particular queues for packets, rerouting instructions in some embodiments. In some embodiments, the latencies can be evaluated on a real time or near real time basis. In some embodiments, leading nodes can be identified by server 112 and latency can be increased at those nodes (e.g., by decreasing priority or increasing traffic to that node) to provide more uniform latency. The packets can also identify a user identification, an application identifications, a latency type (e.g., very low latency, low latency, mid latency, classic latency, etc.), destination residence, destina- tion node, source node, packet size, subscription identifica- tion, geographic identification, path identification (including a list of nodes), licensing regulation identification, etc. In some embodiments, lagging nodes can be identified by server 112 and latency can be decreased at those nodes (e.g., by increasing priority or decreasing traffic to that node) to provide more uniform latency. Advantageously, BQUICK TOP server 112 allows central control of multiple nodes for end-to-end latency control on a subscription, user, application, or device basis in some embodiments.

Figure 8:
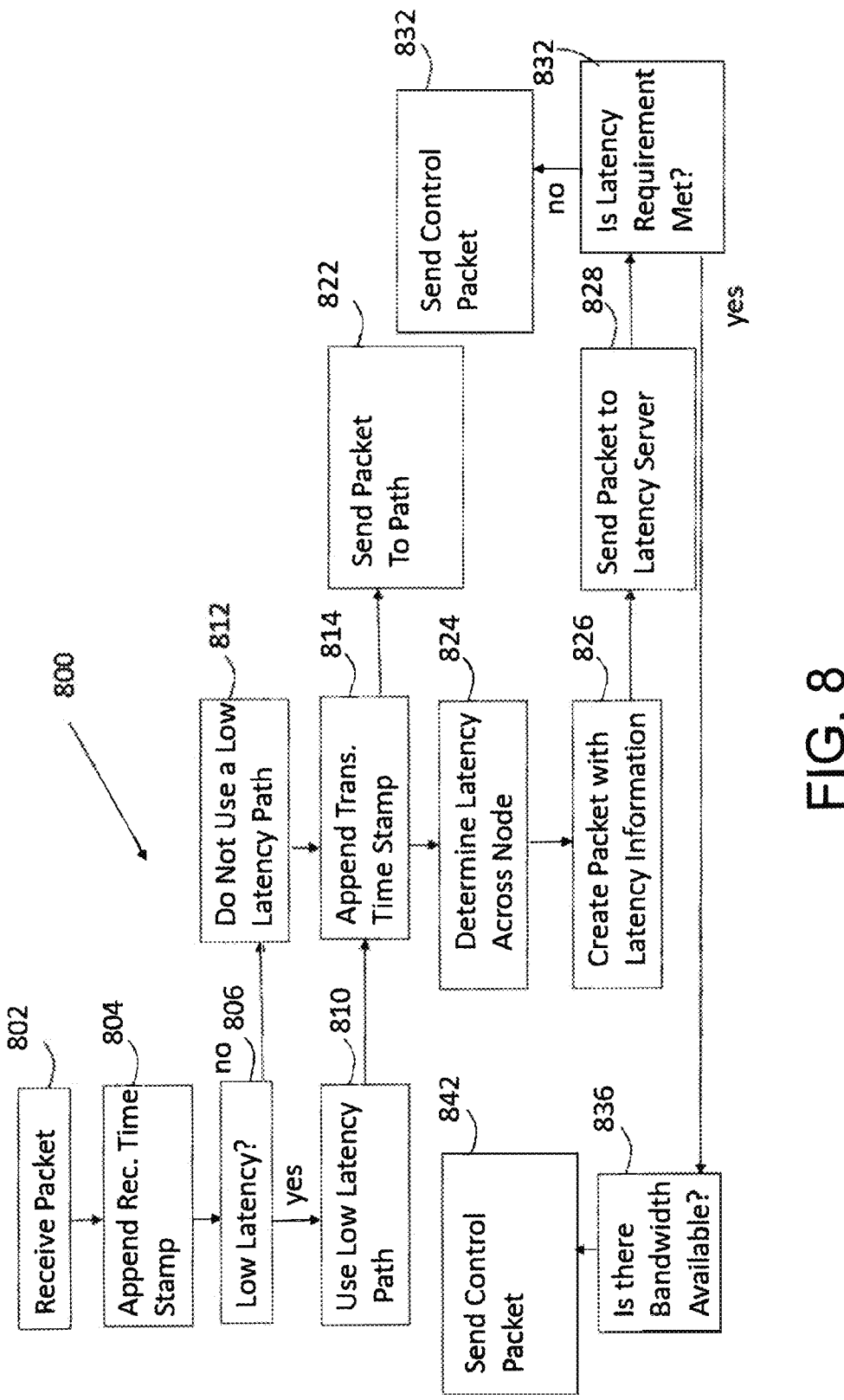
FIG. 8 is a schematic flow diagram for the communication system illustrated in FIG. 1 showing operations for monitoring and/or control according to some embodiments.

With reference to FIGS. 7 and 8, a flow 800 can be performed using communication system 100 (FIG. 1) or portion 700. Flow 800 can be performed to monitor latency introduced by infrastructure 106A for each packet at infrastructure 106A itself, or by providing raw timestamps to BQUICK server 112. Flow 800 can perform only monitoring operations and not include control operations in some embodiments. At an operation 802, any of nodes (e.g., infrastructures 104, infrastructure 106A, optical network unit 120, user device 122, or set top box 136) in portion 700 can receive or provide a packet. A node refers to any electronic device for use in a network that is capable of creating, receiving, or transmitting information over a communication channel in some embodiments. At operation 804, the node appends a receive time stamp to the packet.

At an operation 805, the node determines if the packet is for a low latency application. If so, a low latency path is chosen for the packet in an operation 810. If not, a higher latency path is chosen for the packet in an operation 812. After operations 810 and 812, a transmit time stamp is appended to the packet in an operation 814. In an operation 816, the packet is sent to the next node and flow 800 can be repeated at that node. Operations 814 and 816 can occur in real time or almost simultaneously in some embodiments.

After operation 814, before operation 814, or at the same time as operation 814, latency is determined for the node in an operation 824. The latency or transit time across the node can be determined using the receive time stamp and the transmit time stamp. At an operation 826, a packet is created including latency information. The packet can be received by or used by any node. In some embodiments, the packet is for BQUICK TOP server 112.

The latency information can include a packet identification for the received packet in operation 802, time stamps 708, 720. 712, and 714 and/or delta information, a user identification, an application identification, a latency type (e.g., very low latency, low latency, mid latency, classic latency, etc.), destination residence, destination node, source node, quality of service, packet size, subscription identification, geographic identification, path identification (including a list of nodes), licensing regulation identification, etc. In some embodiments, the latency information refers to any information that can be used to monitor or control packet communication for low latency applications. The latency information can include statistics associated with the information.

In some embodiments, the statistics are tallied according to end device, device type, user identification, application, residence identification, time of day, time of year, weekend, holiday, etc. The statistics can be used to model low latency traffic needs and offer subscription plans to optimize low latency operations. A subscription offer refers to provision of an offer for communications service (e.g., services associated with Internet or network access) in some embodiments. The offer can be provided by an E-mail message, a text, a pop-up advertisement, automated phone call, etc. For example, offers for subscriptions that provide higher bandwidths according to time of day to reduce latency issues can be provided in some embodiments. For example, a user can be offered a plan with more low latency bandwidth in the evening if the statistics show low latency needs for that user are greater in the evening, and conversely, a user can be offered a plan with more low latency bandwidth during work hours if the statistics show low latency needs for that user are earlier in the evening. Further, models of use from end to end can be developed (e.g., by server 112) to optimize low latency bandwidth so bandwidth is shared more effectively throughout the day. For example, paths can be shared among two users who have complementary low latency needs. Further statistics on a node or device basis can identify areas where low latency infrastructure should be increased. Statistics related to type of low latency application can be used to inform the low latency application provider that optimization of its applications may provide greater user enjoyment or to offer the user equipment that reduces the latency issues (e.g.; a new modem, low latency device, etc.). Further still, statistics can be used to identify whether latency increases beyond a threshold over a period of time on a path or for a user. More instances of the latency exceeding a threshold can trigger a different subscription offer to the user or a need for higher bandwidth architecture along the path in some embodiments.

At an operation 828, the packet created in operation 826 is sent to another node (e.g., BQUICK TOP server 112). The packet can be sent by internet service provider infrastructure, a set top box, a cable modem, an optical network unit, a passive optical network modem, an optical line terminal, a cable modem termination system, a digital subscriber line access multiplexer, a digital subscriber line modem, a wireless router, or any other networking device which can access the networking packet in the data pipe. In an operation 832, the receiving node (e.g., BQUICK TOP server 112) determines if the latency requirement for the packet received in operation 802 is being met using the latency information in the packet sent in operation 826. If not, a control packet is sent in operation 832 to one or more nodes in the path for the packet received in an operation 810. The control packet can adjust operations in the path for of nodes for the packet received in an operation 810 to reduce latency. If the latency requirement for the packet received in operation 802 is being met, at an operation 836, the receiving node (e.g., BQUICK TOP server 112) determines if there is additional bandwidth available for the packet received in operation 802.

If the receiving node determines there is additional bandwidth available for the packet received in operation 802, a control packet is sent in an operation 842 by BQUICK TOP server 112 to one or more nodes in the path for the packet received in an operation 810. If not, a control packet is not sent. The control packet can adjust operations in the path of nodes for the packet received in an operation 810 to use bandwidth for other operations or packets.

Although examples of communications systems described above may include devices operating according to an Ethernet and other standards, it should be understood that embodiments of the systems and methods described can operate according to alternative standards and use wireless communications devices other than devices configured as devices. For example, multiple-unit communication interfaces associated with cellular networks, satellite communications, vehicle communication networks, wired networks, and networks can utilize the systems and methods described herein without departing from the scope of the systems and methods described herein.

It should be noted that certain passages of this disclosure may reference terms such as "first" and "second" in connection with devices, mode of operation, transmit chains, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment. The terms coupled or connected includes indirect and direct couplings and connections.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code. Circuitry or circuit may refer to any electronic circuit or combination of circuits. To the extent that a device, circuit, processor or circuitry is described or recited in a claims as performing one or more operations or functions or as configured to perform to one or more operations or functions, the performance of the recited function(s) or operation(s) can be distributed across two or more devices, circuits, or processors without departing from the scope of the claims unless those functions or operations are explicitly recited as being performed on a specific single circuit or set of circuits, processor, or device (e.g., using the phrase "on a single circuit", "on the set of circuits comprising" or "on a single device").

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure. The headings provided in this document are non-limiting.

The applications and servers have been described above with the aid of functional building blocks illustrating the performance of certain significant functions. The boundaries of these functional building blocks have been arbitrarily defined for convenience of description. Functions and structures can be integrated together across such boundaries. Alternate boundaries could be defined as long as the certain significant functions are appropriately performed. Similarly, flow diagram blocks may also have been arbitrarily defined herein to illustrate certain significant functionality. To the extent used, the flow boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules, and components herein, can be implemented as illustrated or by discrete components, application specific integrated circuits, processors executing appropriate software and the like or any combination thereof.

What is claimed is:

1. A server, comprising:
   one or more processors, coupled with memory, configured to execute a first application to:
   monitor end-to-end latency for a network comprising a plurality of devices configured to implement low-latency applications;
   receive latency information from at least one device of the plurality of devices, the latency information comprising (i) time stamps or time period data and (ii) an identification of a low-latency application type for a first packet being communicated via a path across the network; and
   transmit a second packet to adjust, based at least on the time stamps or the time period data providing an indication of latency with respect to transmission of the first packet and the identification of the low-latency application type, operations implemented at one or more nodes to control subsequent transmission of the first packet via the path across the network.

2. The server of claim 1, wherein the one or more processors further execute the first application to receive the latency information from a second application, the second application operating on device of the plurality of devices, the second application being configured to append the time stamps to at least one packet received by the first device, the time stamps indicating a first time the at least one packet is received by the first device and a second time the at least one packet is sent by the first device.

3. The server of claim 2, wherein the one or more processors further execute the first application to determine the latency information associated with communication through the first device using the time stamps, and the time stamps comprising a first time stamp for the first time and a second time stamp for the second time.

4. The server of claim 2, wherein the second application is configured to provide a third packet including the latency information and communicate the third packet to the server via a virtual communication link.

5. The server of claim 2, wherein the time stamps are associated with a path comprising one or more of an access point, a modem, a head end, cloud switches, or an internet.

6. The server of claim 2, wherein the at least one packet is for use in a low latency operation.

7. The server of claim 1, wherein the time stamps are derived from a satellite time source, a DOCSIS timer, a WiFi timer or a device free running clock.

8. The server of claim 1, wherein the latency information comprises a history of time stamps.

9. The server of claim 4, wherein the third packet comprises time stamps from different devices of the plurality of devices, and wherein the different devices are part of an internet service provider infrastructure.

10. A method of providing low latency service, the method comprising:
   providing a first time stamp for a first packet provided to a first device, the first packet being for reception by a low-latency device or as being for use in a low-latency operation;
   providing a second packet comprising latency information to a server remote from the first device via a virtual communication link of a network, the latency information including the first time stamp, a second time stamp associated with transmission of the second packet, and an indication that the first packet corresponds to the low-latency device or is being used in the low-latency operation; and transmitting a third data packet to adjust, based at least on the first time stamp or the second time stamp providing an indication of latency with respect to transmission of the first packet, operations implemented at one or more nodes to control subsequent transmission of the first packet via a path across the network.

11. The method of claim 10, wherein the first time stamp is an ingress time stamp and the second time stamp is an egress time stamp.

12. The method of claim 10, wherein the first device comprises an application configured to append the first time stamp to the first packet.

13. The method of claim 10, wherein the first device comprises internet service provider infrastructure, a set top box, a cable modem, an optical network unit, a passive optical network modem, an optical line terminal, a cable modem termination system, a digital subscriber line access multiplexer, a digital subscriber line modem or a wireless router.

\* \* \* \* \*